Feb. 26, 1963 P. J. BROWNSCOMBE 3,078,760
OPTICAL PROJECTION SYSTEM
Filed Nov. 3, 1958 2 Sheets-Sheet 1
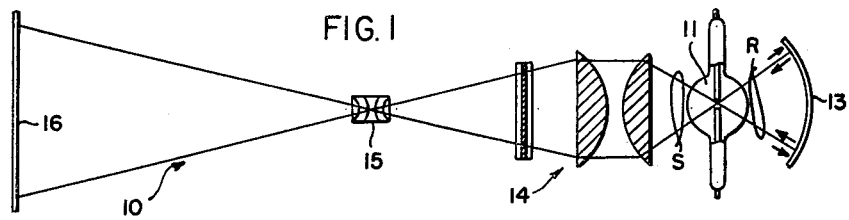
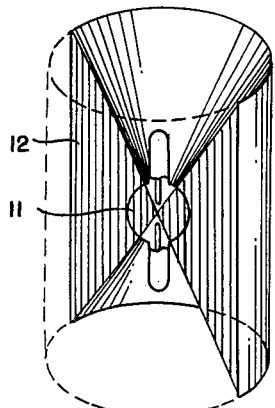
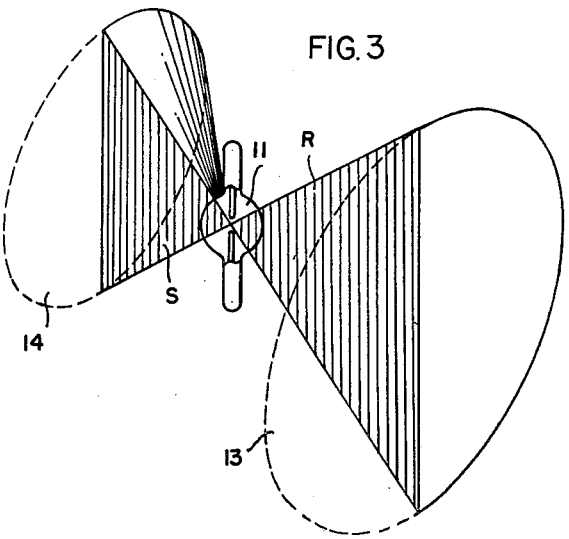
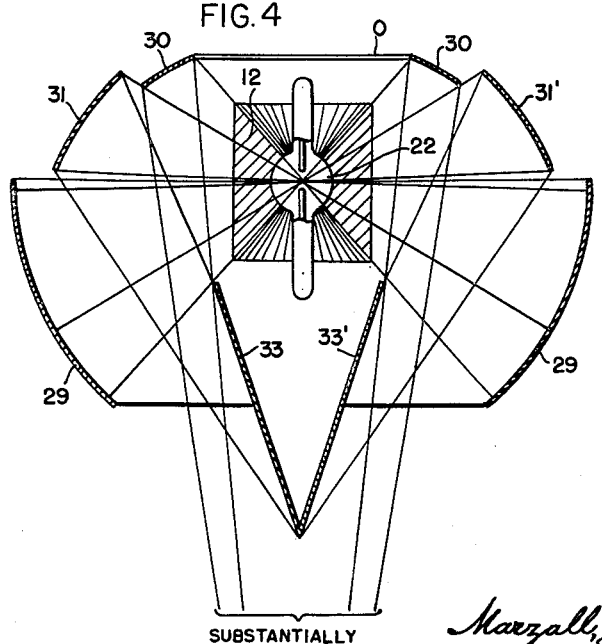
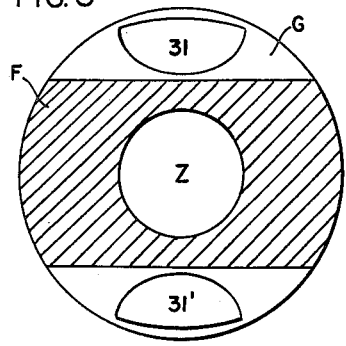
SUBSTANTIALLY ALL AVAILABLE LAMP RADIATION
INVENTOR:—
PHILIP J. BROWNSCOMBE
BY:—
ATTORNEYS

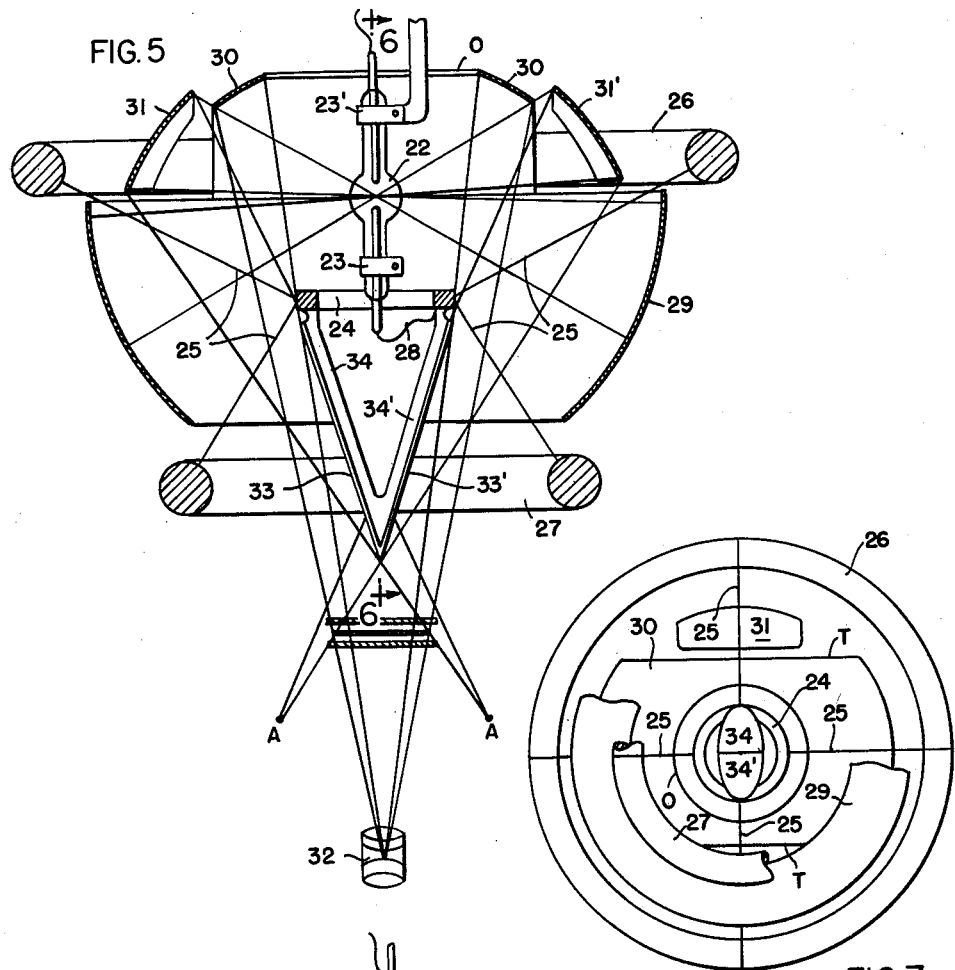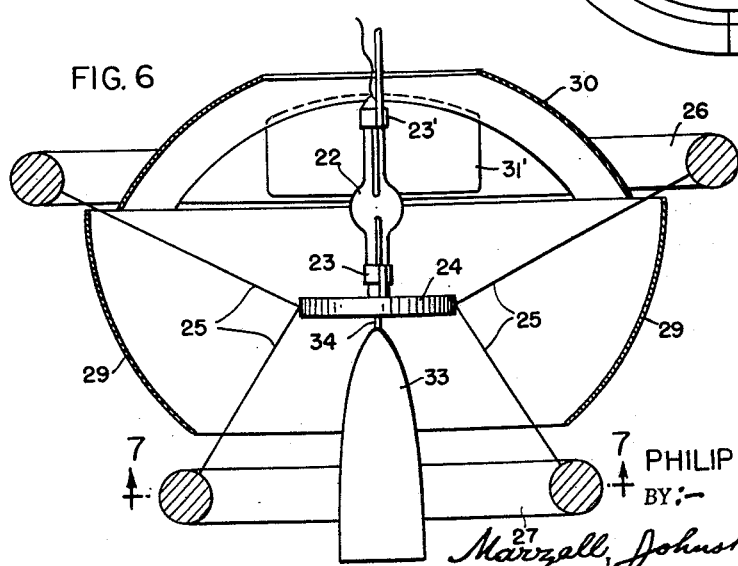

United States Patent Office 3,078,760
Patented Feb. 26, 1963

3,078,760
OPTICAL PROJECTION SYSTEM
Philip J. Brownscombe, Chatham, N.J., assignor to Eugene Dietzgen Co., Chicago, Ill., a corporation of Delaware
Filed Nov. 3, 1958, Ser. No. 771,395
9 Claims. (Cl. 88—24)

The present invention relates in general to optics, and has more particular reference to projection apparatus, especially apparatus adapted for the projection of pictures and the like.

Picture projection is currently accomplished by passing a beam of light through a transparency bearing the material to be projected, to thereby apply an image of such material at a remote picture reproducing station, such as a screen or an easel or other support for photosensitive sheet material on which a print of the projected picture may be formed by conventional photographic procedures, the beam being delivered from a suitable source, such as a lamp and associated reflecting mirror. Lamps emit light in all directions radially thereof, but only such radiation as is delivered through the transparency either directly or by reflection from the mirror is usefully employed for the projection of the picture, the rest of the lamp emitted light being wasted.

An important object of the present invention is to utilize, for projection purposes, substantially all light emitted radially of a projection lamp by delivering the same, as through a projection lens, to a projection area or field; a further object being to apply such light at substantially uniform intensity throughout the area of the projection field.

Another important object is to provide for the application of light, emitted in all directions radially of a lamp forming a light source, into a limited projection zone or field located outwardly of the lamp; a further object being to provide for the application of such lamp emitted light in a projection field of rectangular configuration; a still further object being to provide for the delivery of light, emitted by the lamp in one direction, into selected portions of the field, thereby producing shadowed or dark areas in other portions of the field, while delivering light, emitted by the lamp in other directions, to said dark or shadowed areas so as to illuminate the entire field substantially uniformly.

Another important object of the invention is to apply arc lamps, particularly gas conduction lamps, as light sources in picture projection, such lamps comprising facing electrodes in coaxial alinement and enclosed in a sealed transparent envelope, as of glass, containing a gaseous conduction medium such as mercury vapor, a light emitting arc being formed between the electrodes in response to the application of electrical energy therebetween, said envelope having a central, usually spherical, bulb portion and opposite tubular ends connected with said bulb portion and housing the electrodes. The lamp particularly adapted for picture projection produces a very small bright arc between closely spaced electrodes and may be referred to as a short or compact arc lamp. For optimum performance, arc lamps are preferably mounted for operation with the electrode axis thereof extending vertically, radiation being substantially uniform in all directions radially of said axis and between two cones having apices meeting at the arc and axes coinciding with the electrode axis of the lamp, such cones having apexial angles of the order of 80°, and light delivery within the zones defined by said cones being screened by the electrodes and the electrode containing ends of the lamp envelope.

Another important object of the invention is to provide for delivering, in a direction axially of a projection lamp, light emitted by the lamp in all directions radially thereof; a further object being to deliver, into a projection field disposed outwardly of a lamp and in alinement with its axis, substantially all light emitted radially outwardly of the lamp axis.

Another important object is to provide a projection system embodying an arc lamp mounted for operation with its electrode axis extending vertically, and means for directing lamp emitted rays to and through a projection lens disposed outwardly and below the lamp and in alinement with its axis.

The foregoing and numerous other important objects, advantages and inherent functions of the invention will become apparent as the same is more fully understood from the following description which, taken in connection with the accompanying drawings, discloses a preferred embodiment of the invention.

Referring to the drawings:

FIG. 1 is a diagrammatic view of a conventional projection system embodying an arc lamp as a light source;

FIGS. 2 and 3 are diagrams illustrating the manner in which light is emitted by an arc lamp and utilized for projection purposes in apparatus of the sort shown in FIG. 1;

FIG. 4 is a diagram showing the manner in which light emitted from an arc lamp is utilized in accordance with the present invention;

FIG. 5 is a sectional view through projection apparatus embodying the present invention;

FIG. 6 is a sectional view taken substantially along the line 6—6 in FIG. 5;

FIG. 7 is a view taken substantially along the line 7—7 in FIG. 6; and

FIG. 8 is a diagrammatic view showing the manner in which light is distributed in a projection field in accordance with the present invention.

A conventional optical system 10 for the projection of picture images carried on transparencies is shown in FIG. 1 of the drawings, said system embodying an arc lamp 11 forming a source of high intensity illumination adapted to emit light in all directions radially of the arc, within an emission zone 12 bounded by two cones having apices meeting at the arc of the lamp and axes extending in coincidence with the alined axes of the arc electrodes of the lamp. Behind the lamp is located a mirror 13 for reflecting a cone of lamp emitted light rays R through a condensing lens 14 to a projection lens 15 for delivery thence to a picturing station 16 forming a projection area or fiield, at which may be mounted means for supporting a sheet of photosensitive material in position for exposure. It will be seen that a cone of light rays S comprising a part of the light emission zone 12 will impinge directly upon the condenser 14 and be delivered through the lens 15 together with the rays R applied through the condenser, by action of the reflecting mirror 13. It will be noted, however, that the radiation comprising the cones of light R and S applied through the lens 15 in the projection field 16 is a relatively small portion of the total illumination emitted from the lamp in the circumferential zone 12. All of the radiant energy delivered by the lamp, other than into the conical zones R and S, is dissipated other than at the projection station 16 and hence is lost.

The present invention seeks to utilize substantially all light emitted from a lamp in the pattern shown in FIG. 2 of the drawings at maximum efficiency by directing it through a transparency and an image forming projection lens; a further object being to apply such radiation so that illumination at the edges of the projection area is substantially as intense as the illumination of the area inwardly of its edges, even though the light delivered in the edges and corner portions of the area is transmitted at and along the boundaries of the conical zone R and hence is less intense than the rays emitted from the lamp in its equatorial plane extending through the arc and normal to the axis of the lamp, such rays being delivered in the central portions of the projection area. Another important object of the invention is to provide a system which permits the lamp to be operated in position with its longitudinal axis extending vertically while projecting substantially all of its emitted light as a beam emitted in the direction of said axis and preferably vertically downwardly through a projection lens system into a projection area extending horizontally beneath the lamp.

The foregoing and other objectives may conveniently be obtained by means of an optical system 21 of the sort shown in FIGS. 4 through 8, said system embodying a lamp 22 forming a source of high intensity illumination, said lamp preferably comprising a high pressure concentrated-arc mercury vapor lamp of the sort commonly referred to as a short arc lamp. Any suitable or preferred type or style of lamp may, however, be employed. The lamp 22 may be supported in any preferred or convenient fashion, as by means of clamps 23, 23'. One of said clamps may be connected to a preferably metal ring 24 which, in turn, may be supported by a plurality of pairs of wires 25, stretched under tension between the ring 24 and supporting rings 26 and 27, which may be mounted on any suitable support structure or stand. In addition to providing mechanical support for the lamp carrying ring 24, the wires 25 may also serve to conduct lamp energizing electrical energy to the supported lamp 22 through the pigtail lead 28, which may be electrically connected between the ring 24 and the ring supported end of the lamp.

Surrounding the lower half of the lamp is a ring mirror comprising a reflecting hemisphere 29 having a large opening in its bottom, said hemisphere being supported in any suitable or preferred fashion, as on the ring 27, in position concentric with respect to the axis of the supported lamp. The element 29 serves to receive the lower half of the lamp emitted radiation 12 and to reflect the same back through the arc of the lamp to reflectors 30 and 31, 31', disposed in position to receive not only light reflected by the element 29, but also light emitted by the lamp in the upper portions of its emission zone 12, said elements 30 and 31, 31' being formed and positioned to direct all rays impinging thereon upon a projection lens 32 disposed outwardly of and in alinement with the longitudinal axis of the lamp 22.

As shown, the element 30 has a reflecting surface comprising an ellipsoid of revolution, the element having a central opening O and being mounted in position concentrically surrounding the upper end of the lamp, with one of the foci of the ellipsoid disposed at the center of the arc, the other of the foci of the reflector 30 being disposed at the node of the objective lens. The element 30 is truncated along edges T lying in parallel planes equally spaced from and on opposite sides of the axis of the lamp 22. As a consequence, light originating at the arc will illuminate the projection field substantially in accordance with the shape of the shaded area F in FIG. 8, the straight sides of which area correspond with the truncated sides of the reflector 30 as illustrated in FIGS. 5 and 7. The inner unshaded circular zone Z shown in FIG. 8 corresponds with the central opening O formed in the reflector 30. The central hole O of the mirror 30, of course, reflects no light into the central portion of the projection field. In order to illuminate such central portion, light which would otherwise be wasted by dissipation in the zones outwardly of the mirror edges T is gathered from said zones which correspond with the areas G illustrated in FIG. 8 of the drawings on oposite sides of the shaded area thereof.

To this end, the curved mirrors 31, 31' are disposed on opposite sides of the reflector 30 and outwardly of its edges T, in position to apply lamp radiation, which falls outwardly of the reflector 30, upon flat mirrors 33, 33' which in turn deflect such radiation and apply it upon the node of the lens 32. Each of the reflectors 31 may comprise an ellipsoid of revolution having foci located respectively at the lamp arc and at a point A which is the image of the lens node as seen in the mirrors 33, 33'. The outline shape of each of the mirrors 33, 33' comprises one-half of an ellipse formed by the intersection of the plane of the mirror with a cone whose apex is at the lens node and which passes through the edge of the opening in the reflector 30. As a consequence, the dark spot Z in the projection field corresponding with the opening O in the reflector 30 is precisely filled by light reflected from the mirrors 31, 31' and 33, 33'. The semi-elliptical flat mirrors 33, 33' may be conveniently supported on and from the ring 24 by means of brackets 34, 34'.

It will be seen from the foregoing that all useful light emitted from the lamp on one side of its equatorial plane will impinge upon the spherical reflector 29, will be returned through the arc, which is transparent to its own light, and will impinge upon the reflectors 30, 31 and 31' to reinforce light rays applied upon said reflectors directly from the arc of the lamp. The reflector 30 also receives a substantial portion of the useful light emitted by the lamp on the side of its equatorial plane remote from the reflector 29. The major portion of the remainder of light emitted by the lamp on said side of its equatorial plane is reflected by the mirrors 31, 31' so that the described arrangement constitutes a highly efficient mirror system, which collects substantially all of the useful light emitted from the arc, within the circumferential zone 12, and passes it through the objective lens 32. Moreover, the system distributes the normal radial radiation of the lamp into a rectangular projection field, in manner such that the brightness of the field is greater than it would be if the available light were uniformly distributed conventionally within the area of the circle which circumscribes the rectangular area of the projection field.

The described system also provides unusually uniform light intensity throughout the projection area as the result of alining the lamp axis with the optical projection axis instead of at right angles to the optical axis of the system. Where the lamp is at right angles to the optical axis of the system, as in conventional apparatus of the sort shown in FIG. 1, and a condensing lens either with or without a reflector is employed, the light which illuminates the outer edges of the projection lens is less intense than that applied nearer the center of the lens. This is because the arc, as viewed from the lens edge, is foreshortened by the viewing angle, and, in addition, may be obstructed to some extent by one of the electrodes. As a consequence, the effective size of the arc is reduced in the corners of the projection field, which in turn reduces illumination in the corners of the projection field, unless the lens is stopped down, in which case illumination is cut down over most of the projection area. Such condition is not intolerable in systems which collect light at small or moderate angles, but it produces a progressively increasing disparity of illumination, at the edges and centrally of the projection field, as the angle subtended at the source, by the condenser, increases in the interests of efficient light collection.

In the device shown in FIGS. 5, 6 and 7, it will be seen that a maximum effective arc length is employed for edge illumination in the projection field. Toward the center of the projection area, light is applied at an angle such that the effective length of the arc is reduced. However, the nature of the ellipsoidal reflecting surface of the mirror 30 is such that larger magnification of the arc occurs in those portions of the arc image reflected from the surfaces of the mirror that are nearest the axis of the system. This effect results from the fact that the ratio of the distance between the reflector and the objective lens to the distance from the reflector to the arc is a maximum for light applied in the portions of the reflector that are nearest to the optical axis of the system. As a consequence, a highly desirable compensating effect is created such that the arc image formed at the lens 32 is nearly constant in size as formed by all portions of the reflector. The image thus formed by each portion of the reflector fills the objective lens aperture, as is necessary for full illumination, but does not greatly overfill it, which would result in light loss.

If the light source employed in the system were a true point source of light, a line of demarcation would be established between the central area of the field, which is illuminated by the flat mirrors 33, 33', and the surrounding field area F, which is illuminated by light reflected from the concave mirror 30. The arc which forms the actual source of light, however, has appreciable size. As a consequence, the areas illuminated by the different reflectors overlap and blend into each other so that no line of demarcation therebetween is noticeable.

It is thought that the invention and its numerous attendant advantages will be fully understood from the foregoing description, and it is obvious that numerous changes may be made in the form, construction and arrangement of the various parts without departing from the spirit or scope of the invention or sacrificing any of its attendant advantages, the form herein described being a preferred embodiment for the purpose of demonstrating the invention.

The invention is hereby claimed as follows:

1. A projection system comprising the combination, with an arc lamp having a pair of oppositely extending alined electrodes having spaced facing ends adapted to form an arc as a light source therebetween, of a hemispherical ring mirror formed with a central opening and mounted in position encircling one end of the lamp up to a plane through the arc and normal to said electrodes, said mirror being concentric with respect to the axis of said alined electrodes, a principal projection mirror of concave configuration and formed with a central opening, said projection mirror being supported in position concentrically encircling the other end of the lamp up to the equatorial plane of said bulb, said projection mirror having spaced parallel sides truncated on planes extending on opposite sides of and equally spaced from the electrode axis of said lamp, said projection mirror being positioned to receive lamp emitted rays reflected from the ring mirror as well as directly and to deliver such rays through the opening of the ring mirror and upon an objective lens disposed outwardly of the lamp and in line with its electrode axis, a pair of deflecting mirrors mutually inclined and disposed within the ring mirror and outwardly of the ring mirror encircled end of the lamp, and a pair of auxiliary projection mirrors disposed outwardly of the truncated sides of the principal projection mirror in position each to reflect light upon a corresponding one of said deflecting mirrors and thence upon the objective lens.

2. A projection system comprising the combination, with an arc lamp having an envelope embodying a central bulb and a pair of oppositely extending electrode containing tubular envelope portions, of a concave projection mirror mounted in position at an end of the lamp, said projection mirror having spaced parallel sides truncated on planes extending on opposite sides of and equally spaced from the electrode axis of said lamp, said projection mirror being positioned to receive lamp emitted rays and to deliver such rays upon an objective lens disposed outwardly of the lamp and in line with its electrode axis, a ring mirror encircling the end of the lamp remote from said projection mirror in position to reflect lamp emitted rays onto the projection mirror, a pair of deflecting mirrors mutually inclined and disposed outwardly of the end of the lamp remote from the projection mirror, and a pair of auxiliary projection mirrors disposed outwardly of the truncated sides of the principal projection mirror and between said sides and the adjacent edge of the ring mirror in position each to reflect light upon a corresponding one of said deflecting mirrors and thence upon the objective lens.

3. A projection system comprising the combination, with a lamp forming a light source, of a principal projection mirror mounted at one end of the lamp in position to receive rays emitted from the lamp, said projection mirror having spaced parallel sides and being positioned to deliver rays into the areas of a projection field surrounding a central, dark zone of said field, a ring mirror encircling the end of the lamp remote from said projection mirror in position to reflect lamp emitted rays onto the projection mirror, a pair of deflecting mirrors mutually inclined and disposed outwardly of the end of the lamp remote from the projection mirror, and a pair of auxiliary projection mirrors disposed outwardly of the sides of the principal projection mirror and between said sides and the adjacent edge of the ring mirror in position each to reflect light on a corresponding one of said deflecting mirrors and thence into said central zone to light said zone.

4. A projection system comprising the combination, with a lamp forming a light source, of a principal projection mirror mounted at an end of the lamp in position to receive rays emitted from the lamp, said projection mirror having spaced parallel sides and being positioned to deliver rays into the areas of a projection field surrounding a central, dark zone of said field a ring mirror encircling the end of the lamp remote from said projection mirror in position to reflect lamp emitted rays onto the projection mirror, and a mirror system including a pair of auxiliary projection mirrors disposed outwardly of the spaced sides of said principal projection mirror and between said sides and the adjacent edge of the ring mirror in position to reflect substantially all of the reflected light of said mirror system into said central zone.

5. A light projection system comprising the combination, with an arc lamp forming a light source, of a concave ring mirror having a central opening encircling one end of said arc lamp concentrically with respect to the lamp axis, said concave ring mirror being positioned and formed to reflect light rays impinging thereon back through said light source, a projection mirror mounted at the other end of said arc lamp to receive and reflect direct rays from said light source and reflected rays from said ring mirror past said lamp, said projection mirror having a large aperture therein opposite said lamp whereby the light field reflected from said projection mirror has a dark zone centrally of said field, and an auxiliary projection mirror system including a pair of reflectors disposed on opposite sides of the lamp and between the edges of the ring and projection mirrors in position to receive light rays directly from said source together with source emitted rays reflected by said ring mirror and to reflect substantially all of said direct and reflected light into said dark zone without substantial overlapping thereof into the light field reflected by said projection mirror.

6. A projection system comprising the combination, with a lamp forming a light source, of a ring mirror encircling one end of said lamp concentric with respect to its axis, a projection mirror mounted at the other end of the lamp in position to receive light rays directly from said source, as well as rays emitted at the source and reflected by the ring mirror upon the projection mirror, said projection mirror being disposed concentric with respect to the axis of the lamp and formed to deliver the rays reflected thereby into the areas of a projection field surrounding a central dark zone thereof, and an auxiliary projection mirror system including a reflector element disposed between the ring and projection mirrors in position to receive rays directly from said light source, as well as source emitted rays reflected upon said element by said ring mirror, and to reflect all rays thus applied thereto into the central dark zone of the field.

7. A projection system comprising the combination, with a lamp forming a light source, of a ring mirror encircling one end of said lamp concentric with respect to its axis, a projection mirror mounted at the other end of the lamp in position to receive light rays directly from said source, as well as rays emitted at the source and reflected by the ring mirror upon the projection mirror, said projection mirror being disposed concentric with respect to the axis of the lamp and formed to deliver the rays reflected thereby into the areas of a projection field surrounding a central dark zone thereof, said projection mirror comprising a spherical reflector formed with spaced parallel and chordally truncated opposite side edges, and an auxiliary projection mirror system including a pair of reflector elements respectively mounted outwardly and alongside of said truncated edges of the projection mirror and between said edges and the facing edge of the ring mirror in position to receive rays directly from said light source, as well as source emitted rays reflected by said ring mirror, and to reflect all rays thus applied to said reflector elements into the central dark zone of the field.

8. A projection system as set forth in claim 6, wherein said auxiliary mirror system includes an inclined deflecting mirror mounted within the ring mirror in position to receive the light rays reflected from said reflector element and to direct the same into the central dark zone of the field.

9. A projection system as set forth in claim 7, wherein said auxiliary mirror system includes a pair of oppositely inclined deflecting mirrors mounted within the ring mirror and on opposite sides of the encircled end of the lamp in position to receive the light rays reflected respectively from said reflector elements, and to direct the same into the central dark zone of the field.

References Cited in the file of this patent

UNITED STATES PATENTS 2,741,691    Lee    Apr. 10, 1956

FOREIGN PATENTS 213,947    Switzerland    June 16, 1941
284,217    Italy    Apr. 6, 1931
302,983    Italy    Nov. 15, 1932
610,530    France    June 12, 1926
1,095,418    France    Dec. 22, 1954